(12) United States Patent
Just

(10) Patent No.: US 11,881,073 B2
(45) Date of Patent: Jan. 23, 2024

(54) ACCESS SYSTEM AND CONTAINER FOR COMMUNAL OBJECTS

(71) Applicant: Peter Just, Copenhagen (DK)

(72) Inventor: Peter Just, Copenhagen (DK)

( * ) Notice: Subject to any disclaimer, the term of this patent is extended or adjusted under 35 U.S.C. 154(b) by 0 days.

(21) Appl. No.: 16/302,506

(22) PCT Filed: May 17, 2017

(86) PCT No.: PCT/IB2017/052909
§ 371 (c)(1),
(2) Date: Nov. 16, 2018

(87) PCT Pub. No.: WO2017/199180
PCT Pub. Date: Nov. 23, 2017

(65) Prior Publication Data
US 2019/0172298 A1    Jun. 6, 2019

Related U.S. Application Data

(60) Provisional application No. 62/337,655, filed on May 17, 2016.

(51) Int. Cl.
*G07C 9/00* (2020.01)
*G06Q 10/087* (2023.01)
(Continued)

(52) U.S. Cl.
CPC .......... *G07F 17/0028* (2013.01); *G06F 21/35* (2013.01); *G06Q 10/087* (2013.01);
(Continued)

(58) Field of Classification Search
CPC .. G06Q 10/087; G06Q 20/18; G07C 9/00174; G07C 9/00182; G07C 9/00309;
(Continued)

(56) References Cited

U.S. PATENT DOCUMENTS 1,412,784 A * 4/1922 Holmberg ............... E05G 1/024
109/84
4,791,411 A * 12/1988 Staar .................... G06Q 10/087
340/568.1

(Continued)

FOREIGN PATENT DOCUMENTS

DE    102014105243 A1    6/2015
EP        0924657 A2    6/1999
(Continued)

OTHER PUBLICATIONS

Machine English equivalent translation of JP 2007310492, retrieved from European Patent Office, retrieved Jun. 4, 2022 (Year: 2022).*

(Continued)

*Primary Examiner* — Suezu Ellis
(74) *Attorney, Agent, or Firm* — Sterne, Kessler, Goldstein & Fox P.L.L.C.

(57) ABSTRACT

Described are methods and systems for accessing shared communal objects. A physical object container holds and protects the objects, keeping them secure and protected for future use. The object container senses the state and status of the objects contained within it. The object container is only openable by authorized users. An information infrastructure backend coordinates the scheduling and usage of objects stored within the object container.

10 Claims, 10 Drawing Sheets

(51) Int. Cl.
    *G07F 17/00*         (2006.01)
    *G06F 21/35*         (2013.01)
    *G07F 9/00*          (2006.01)
    *G06Q 20/32*         (2012.01)
    *G07F 11/16*         (2006.01)
    *G07F 11/32*         (2006.01)
    *H04L 9/08*          (2006.01)

(52) U.S. Cl.
    CPC ..... *G06Q 20/3224* (2013.01); *G07C 9/00896* (2013.01); *G07F 9/001* (2020.05); *G07F 9/002* (2020.05); *G07F 11/16* (2013.01); *G07F 11/32* (2013.01); *G07F 17/0042* (2013.01); *H04L 9/088* (2013.01); *G07C 9/00571* (2013.01); *G07C 2209/04* (2013.01); *G07C 2209/08* (2013.01)

(58) Field of Classification Search
    CPC ........... G07C 2009/00317; G07C 2009/00325; A47G 29/141; A47G 2029/142; A47G 2029/143; A47G 2029/149; G07F 17/0071; G07F 17/0078; G07F 17/0092; G07F 9/001
    USPC .......................................................... 235/381
    See application file for complete search history.

(56) References Cited

U.S. PATENT DOCUMENTS

| | | | | |
|---|---|---|---|---|
| 6,152,321 | A * | 11/2000 | Staar | G07F 9/002 221/6 |
| 10,424,144 | B2 | 9/2019 | Carstens et al. | |
| 2002/0145520 | A1* | 10/2002 | Maloney | G06K 17/00 340/568.1 |
| 2002/0165787 | A1* | 11/2002 | Bates | G07F 9/002 705/26.81 |
| 2003/0076230 | A1* | 4/2003 | Runyon | G08B 13/1427 340/572.1 |
| 2005/0248455 | A1* | 11/2005 | Pope | G06K 19/0717 374/E1.004 |
| 2008/0059338 | A1* | 3/2008 | Hubbard | B25H 3/028 705/28 |
| 2008/0073373 | A1* | 3/2008 | Vicentin | G07F 11/165 221/210 |
| 2009/0320538 | A1 | 12/2009 | Pellaton | |
| 2010/0138037 | A1* | 6/2010 | Adelberg | G07F 9/001 700/241 |
| 2010/0295665 | A1* | 11/2010 | Landau | G08B 21/0288 340/10.42 |
| 2012/0001758 | A1* | 1/2012 | Zhu | G16H 10/60 340/572.8 |
| 2014/0316561 | A1* | 10/2014 | Tkachenko | G07F 11/02 700/236 |
| 2014/0316875 | A1* | 10/2014 | Tkachenko | G07F 9/002 705/14.25 |
| 2015/0211258 | A1* | 7/2015 | Gokcebay | E05C 1/04 70/278.1 |
| 2015/0356801 | A1* | 12/2015 | Nitu | G07C 9/00912 340/5.61 |
| 2016/0307150 | A1* | 10/2016 | Rogers | G06Q 10/08 |
| 2017/0140593 | A1* | 5/2017 | Pluss | G07C 9/0069 |
| 2017/0143145 | A1* | 5/2017 | Peynet | E05F 15/79 |
| 2017/0286905 | A1* | 10/2017 | Richardson | G06Q 10/0832 |
| 2018/0060621 | A1* | 3/2018 | Demaretz | G06K 19/07758 |
| 2018/0262891 | A1* | 9/2018 | Wu | H04W 12/065 |
| 2019/0325411 | A1* | 10/2019 | Kai | G06Q 20/327 |

FOREIGN PATENT DOCUMENTS

| | | | | |
|---|---|---|---|---|
| EP | 1559855 | A1 | 8/2005 | |
| JP | 2007310492 | A * | 11/2007 | |
| WO | WO-2013043757 | A2 * | 3/2013 | ........... G06Q 20/123 |
| WO | WO-2013110020 | A1 * | 7/2013 | ............. G06Q 20/42 |
| WO | WO 2015/100390 | A1 | 7/2015 | |

OTHER PUBLICATIONS

International Search Report and Written Opinion of the International Searching Authority directed to related International Patent Application No. PCT/IB2017/052909, dated Nov. 16, 2017; 21 pages.

A. Menezes et al., "Chapter 10: Identification and Entity Authentication," Handbook of Applied Cryptography, CRC Press, Boca Raton, FL, Oct. 1, 1996; pp. 385-424, retrieved Sep. 13, 2021.

Quentin Jones et al., "People-to-People-to Geographical-Places: the P3 Framework for Location-Based Community Systems," Computer Supported Cooperative Work (CSCW), Kluwer Academic Publishers, DO, vol. 13, No. 3-5, Aug. 2004; 26 pages, retrieved Sep. 13, 2021.

Aaron Wright et al., "Decentralized Blockchain Technology and the Rise of Lex Cryptographia," posted Mar. 20, 2015; 58 pages, available at: https://papers.ssrn.com/sol3/papers.cfm?abstract_id=2580664; retrieved Sep. 13, 2021.

International Preliminary Report on Patentability directed to related International Patent Application No. PCT/IB2017/052909, dated Nov. 20, 2018; 15 pages.

* cited by examiner

ACCESS SYSTEM AND CONTAINER FOR COMMUNAL OBJECTS

BACKGROUND

Field

The disclosure relates to methods and systems for providing multi-user access to shared communal objects.

Background

Recent technological developments have made possible new forms of consumption. One of these new forms of consumption is so-called collaborative consumption, also referred to as the sharing economy. In the sharing economy people share access to items rather than purchasing them. An example of the sharing economy in action is the recent development of bicycle sharing programs. In a bicycle sharing program, often sponsored or co-developed with municipalities, people can rent bicycles at various locations throughout a city and return them to the same or a different location. These systems can improve access to bicycles while reducing the need for users to purchase them. But collaborative consumption raises new challenges as well. Sharing or renting items has been possible for a long time, but only recent technological developments have made the sharing economy possible.

Some objects, however, have not been traditionally conducive to integration into the sharing economy. Smaller objects are susceptible to theft, and must be secured, necessarily restricting access to the objects. For example, in the bicycle sharing program example, theft, damage, and other such issues must be addressed to maintain availability and reliability of the bicycles. Even if objects are available, they may go unused because of a lack of coordination. While the Internet of Things (IoT) extends networking from traditional computers to non-traditional objects having embedded electronics and software, coordinated infrastructure for optimizing their use is lacking.

At the same time, the rise of digital devices is driving people to become more insular and less social. It is increasingly difficult to meet new people having similar interests in the same location, particularly for individuals who are new to a particular location. People also tend to interact socially in close peer groups, such that interaction with individuals outside their immediate peer group is limited. However, in a public space, one is surrounded by individuals who may at first appear to be outside the person's peer group, but with whom a person may share more common ground than they realize. Identifying those commonalities and connecting with such individuals, though, is daunting to many people.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

Figure 5A:
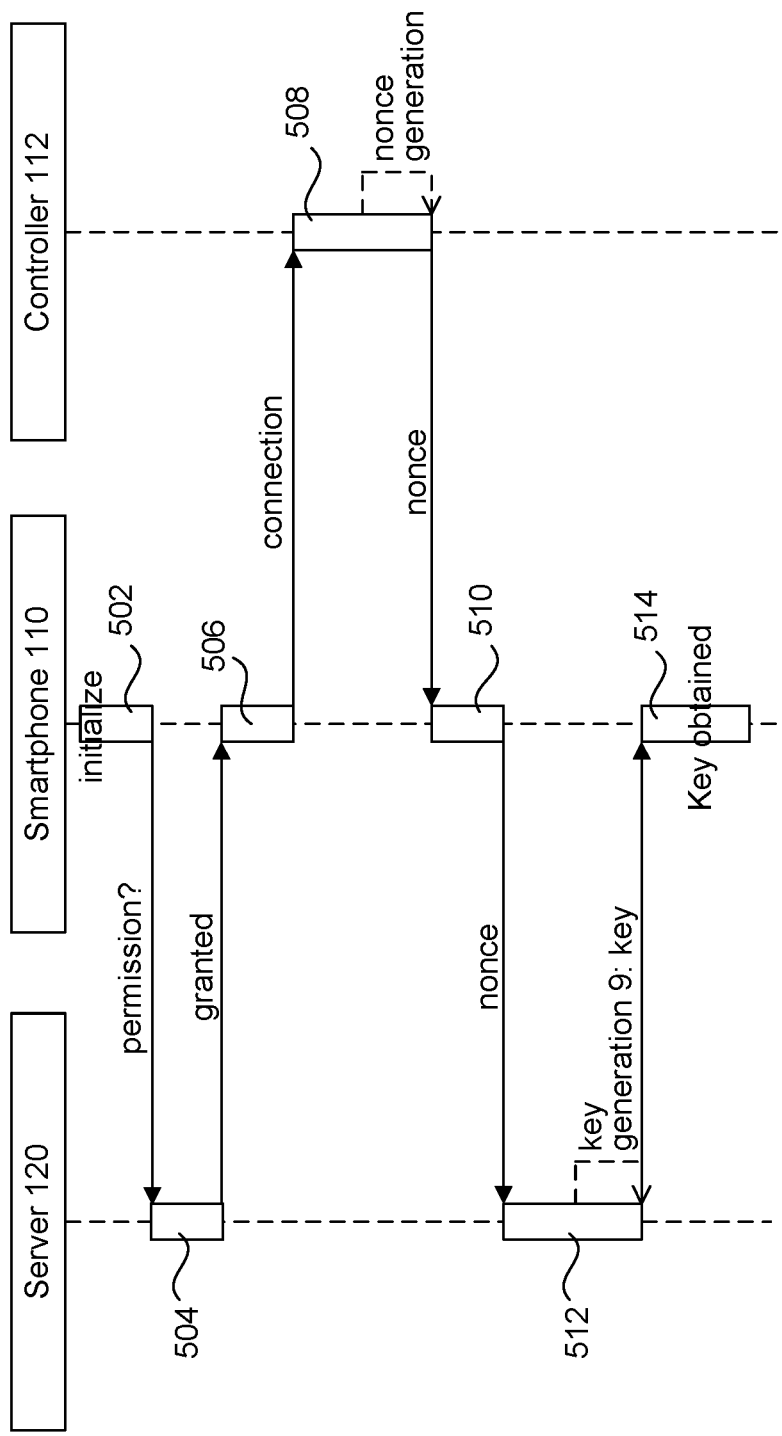
Figure 5B:
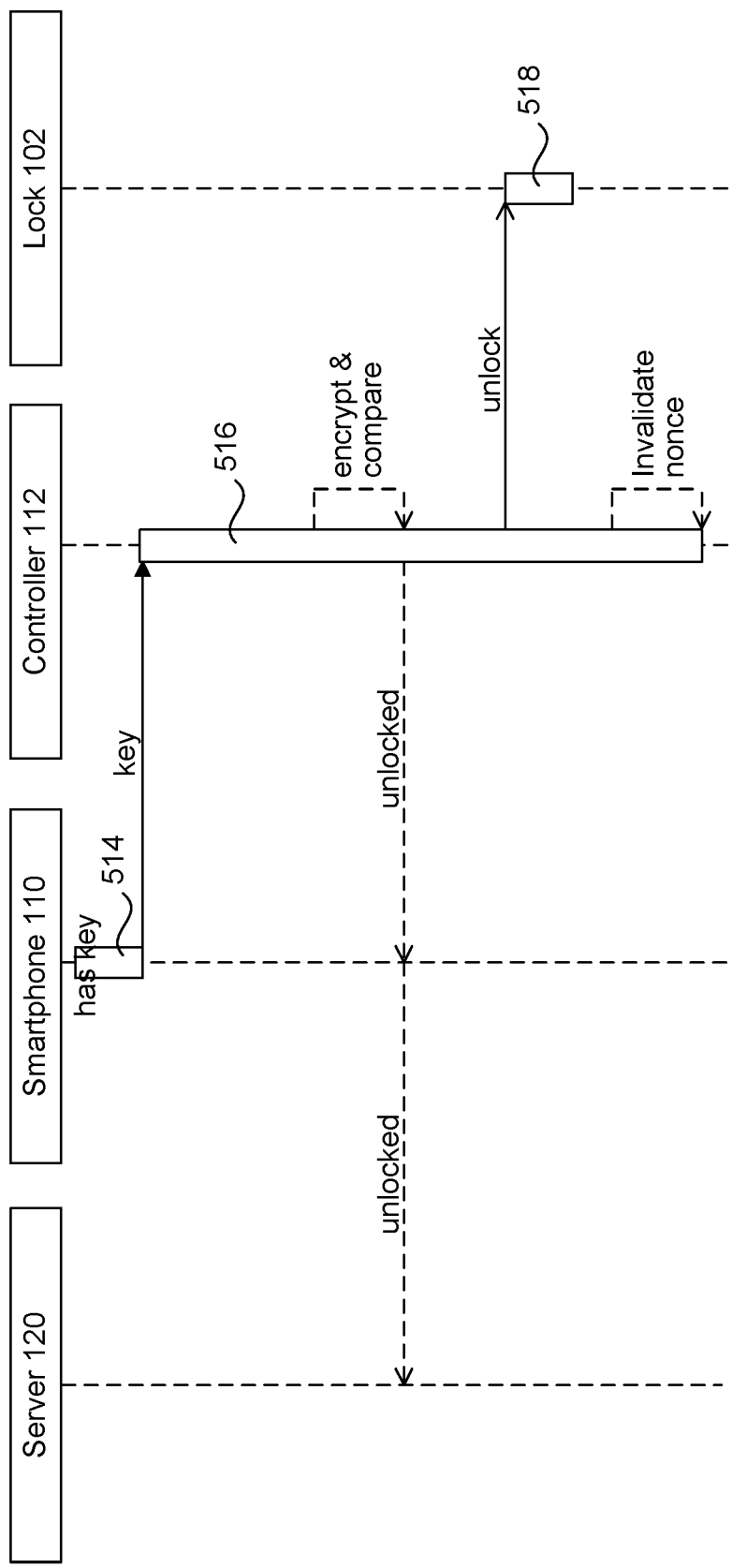

FIGS. 5A and 5B together illustrate a process flow diagram of a process for unlocking an Object Container according to an embodiment.

Figure 6B:
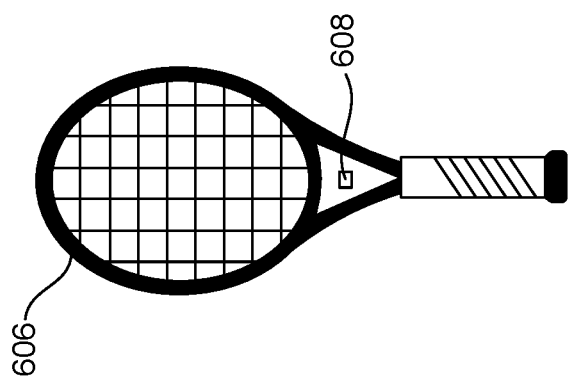
Figure 6A:
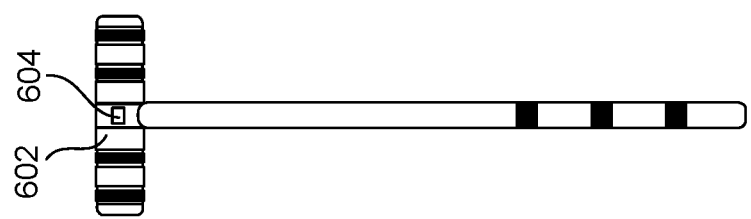

FIG. 6A illustrates an example Object according to an embodiment.

FIG. 6B illustrates another example Object according to an embodiment.

Figure 7:
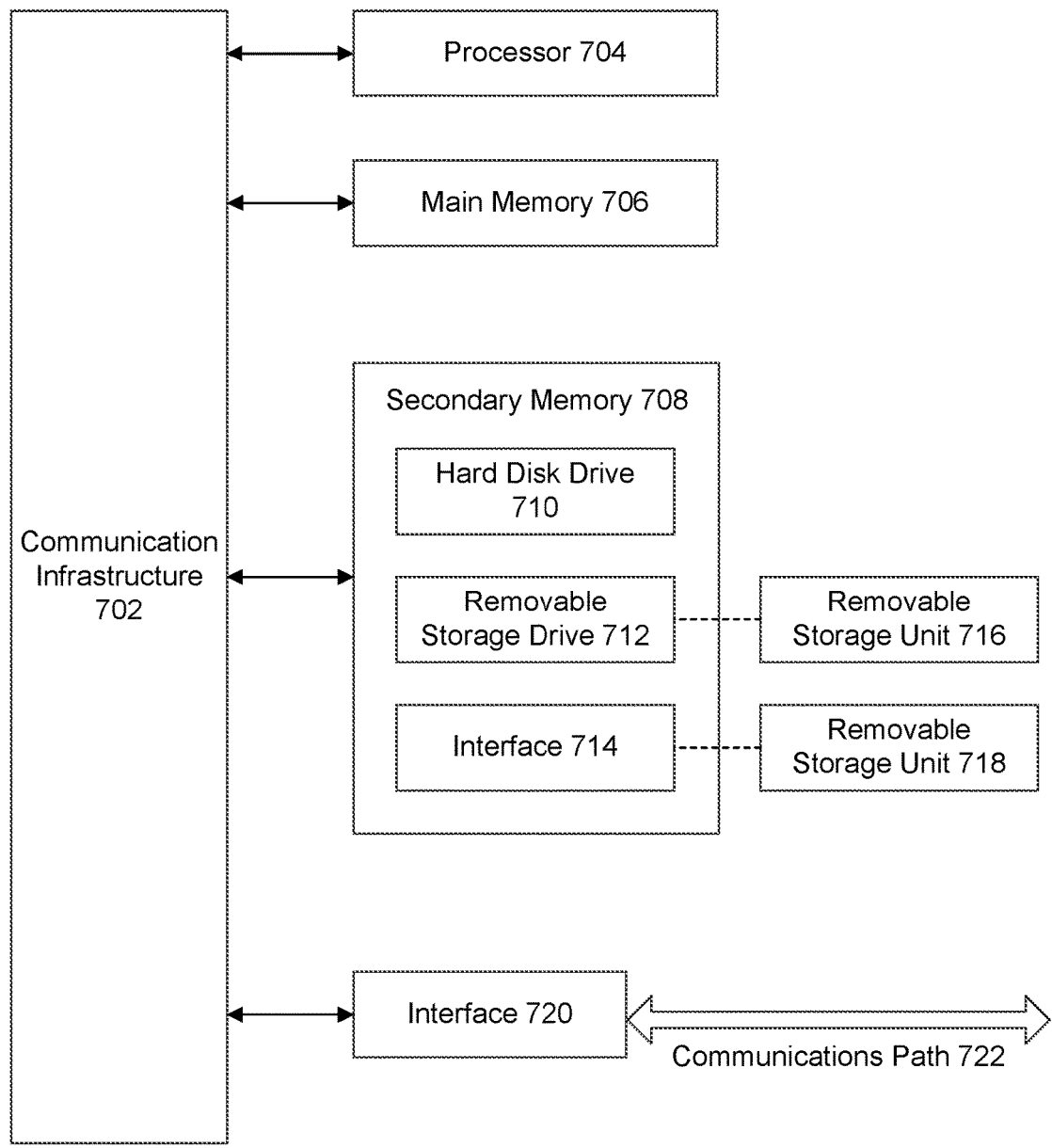

FIG. 7 illustrates an example computer system for use with aspects of the present invention, according to an embodiment.

Figure 8:
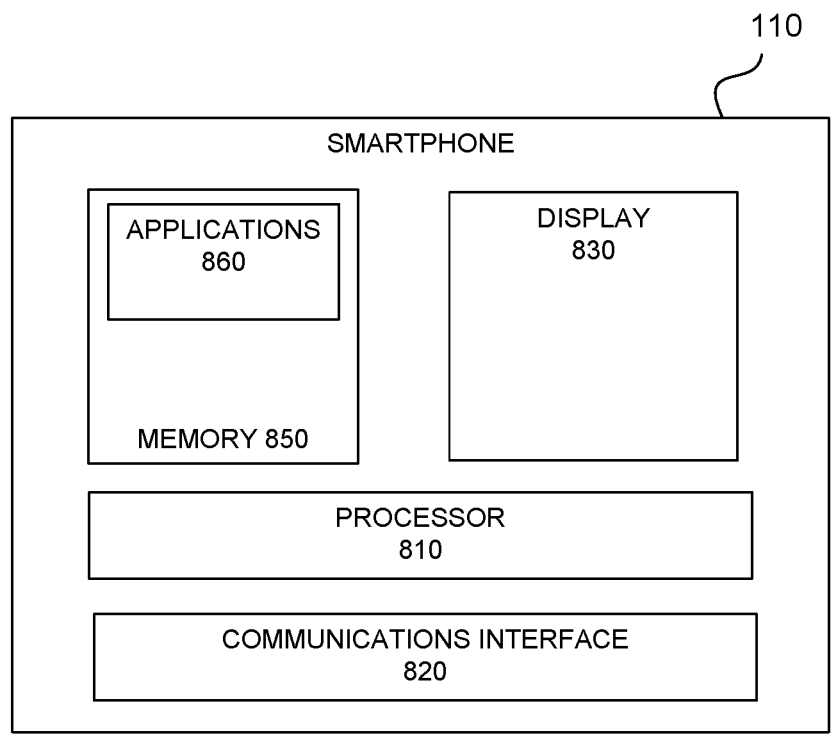

FIG. 8 illustrates an example Smartphone for use with aspects of the present invention, according to an embodiment.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The recent development of inexpensive distributed computing and sensory resources, also known as the internet of things, has made the sharing economy possible. By using small, inexpensive, and often battery powered electronics, the shared resources of the sharing economy can be monitored and tracked. Information technology infrastructure can also be leveraged to coordinate usage among participants. For example, information technology can be leveraged to make reservations, transmit messages, and collect payments for various systems. Embodiments of the present invention implement new techniques and infrastructure for seamlessly integrating physical devices with remote access systems that can be used to provide secure yet easy access to shared items.

Further, there is an opportunity to use new developments in technology to drive positive social interactions. While commonalities may exist between individuals who appear different or who participate in different social groups, such commonalities may not be immediately apparent to either of the individuals. However, embodiments of the present invention identify those sub-surface commonalities in a manner that challenges societal norms and expectations, and identifies similarities between seemingly disparate individuals. These commonalities can then be used to encourage positive social experiences and reduce social biases.

Object Container

Figure 1:
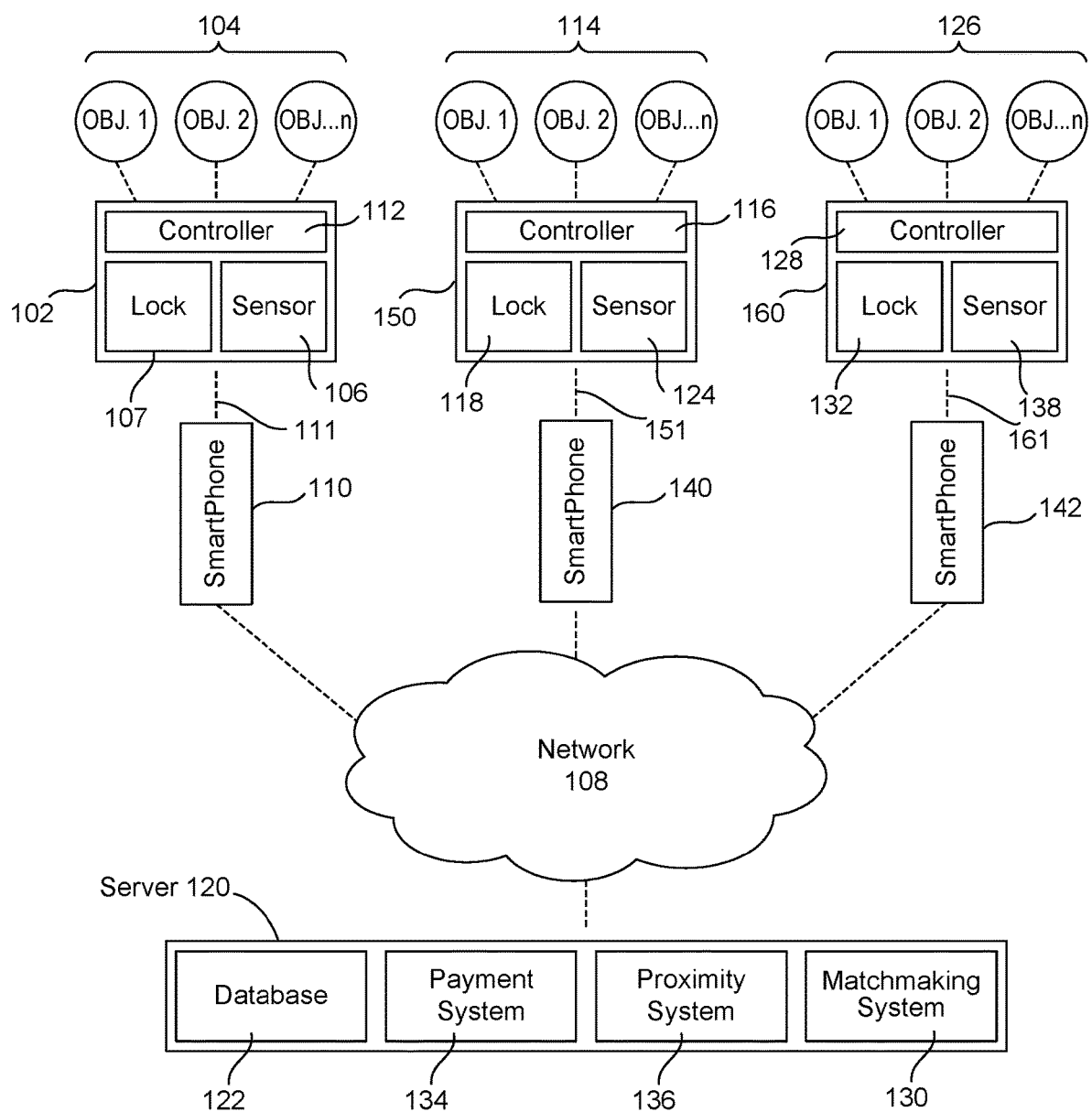
FIG. 1 illustrates an example embodiment of an Object Sharing System.

FIG. 1 illustrates an embodiment of an Object Sharing System 100. Object Sharing System 100 includes, among other things, Object Containers 102, 114, and 126. Each Object Container includes multiple Objects within a housing, a Controller, a Lock, and a Sensor. For example, Object Container 102 includes Objects 104, a Lock 107, at least one Sensor 106, and a Controller 112. Object Container 102 communicates with Smartphone 110 via Communication Channel 111. Communication Channel 111 may be designed for any method to transmit data between Object Container 102 and Smartphone 110, such as radio frequency communications, acoustic communications, infrared light-based communications, or wired communication.

Similarly, Object Container 150 includes Objects 114, a Lock 118, at least one Sensor 124, and a Controller 116, and communicates with Smartphone 140, while Object Container 160 includes Objects 126, a Lock 132, at least one Sensor 138, and a Controller 128 and communicates with Smartphone 142. While the present disclosure will describe Object Containers and interactions therewith with reference to Object Container 102, one of skill in the art will recognize that such a description is pertinent to any other Object Container within Object Sharing System 100, such as Object Containers 150 and 160. One of skill in the art will also recognize that any number of additional Object Containers may be used within Object Sharing System 100 in a similar manner as described herein. Further, one of skill in the art will recognize that different Smartphones can be used with different Object Containers at different times.

In an embodiment, Object Container 102 is a hardened steel enclosure designed to be tamper-proof and weather resistant. For example, high grade steel of a thickness in the range of 2-4 mm may be used for a high level of security. Internal reinforcements and rigid construction methods may be used to make Object Container 102 resistant to prying open, denting, dismantling, or other forms of abuse. All openings may be designed to be resistant to inclement weather. For example, openings may be implemented such that dripping water will not seep into the inside of Object Container 102, and may include gaskets to ensure water resistance. In other embodiments, other materials and thicknesses of material may be used. For example, plastic-type materials of sufficient grade and thickness may be used rather than hardened steel. Other design features and materials may be used to build Object Container 102 as long as the design and use goals are met. In an embodiment, Object Container 102 is designed so as to be a visually compelling piece of "street furniture."

In an embodiment, Object Container 102 need not be resistant to weather or extreme physical abuse. For example, Object Container 102 may be placed indoors in a friendly environment where one would not expect such rough usage. In these cases, Object Container 102 need not necessarily be made to the same degree of physical security and weather resistance as Object Container 102 that is designed to be placed outdoors in public spaces. For these installations, a lighter gauge and grade of material may be used to give Object Container 102 a lower cost, more visual appeal, or a lighter weight.

Figure 3:
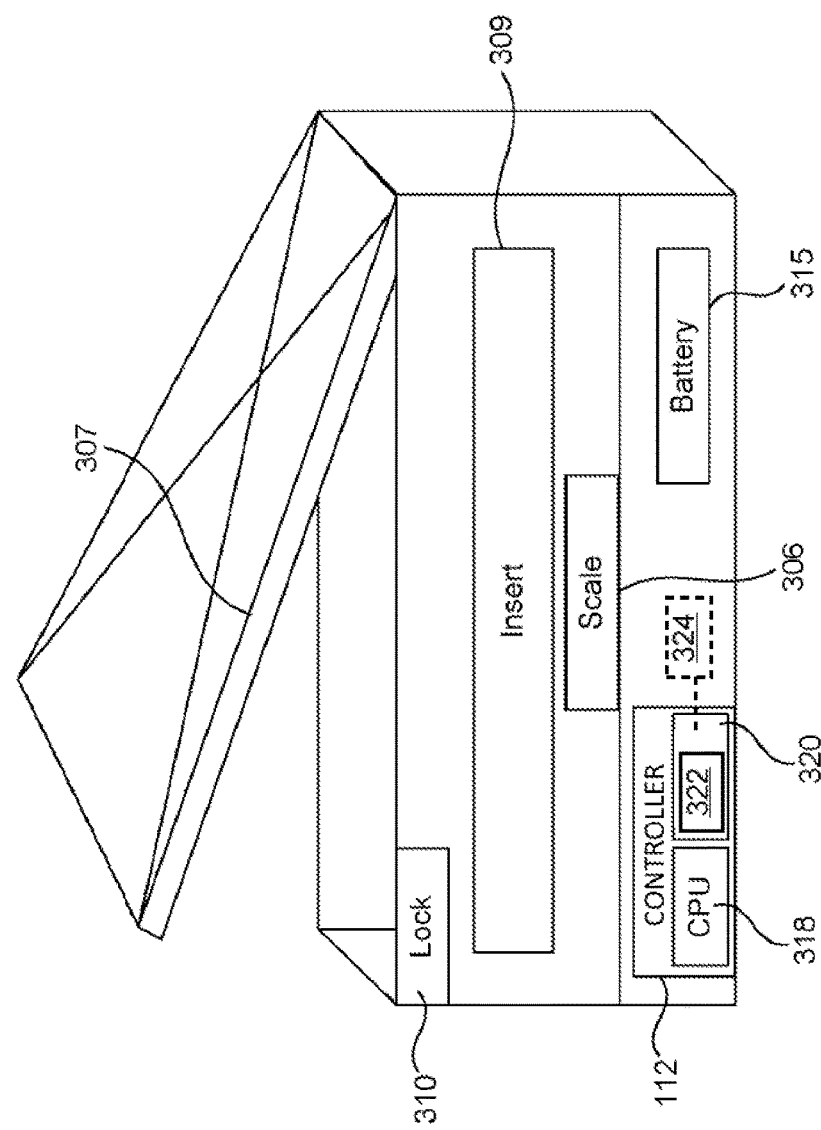
FIG. 3 illustrates an example embodiment of an Object Container.

An embodiment of Object Container 102 is illustrated in FIG. 3. In an embodiment, Object Container 102 includes Door 307, Insert 309, Controller 112, and Lock 310. Door 307 may be tamper-proof and weather resistant to the same degree as Object Container 102. Door 307 may include gaskets, seals, interlocking portions, or other such design elements to make it as impervious as necessary for the application. Door 307 is attached to Object Container 102, for example via one or more hinges. In an embodiment, Door 307 includes counterbalancing springs, compressed gas strut supports, or other such elements to make Door 307 easy to open with minimal effort. Optionally, Door 307 also includes an automatic closing feature such that Door 307 will close and latch shut in the absence of a counter-force. In some embodiments, Door 307 will remain open until shut to ease access to the contents of Object Container 102.

In an embodiment, Lock 310 is an electronic lock that secures Door 307 shut. Lock 310 is electronically controlled by Controller 112. Lock 310 may be any kind of locking mechanism that secures Door 307 closed and renders Object Container 102 locked shut until unlocked. In an embodiment, Lock 310 is a solenoid-based lock that uses a solenoid to latch or unlatch a strike, bolt, or other securing mechanism. In another embodiment, Lock 310 is a magnetic lock that uses an electromagnet and a corresponding armature to secure Door 307 shut while the electromagnet is powered on.

Figure 2A:
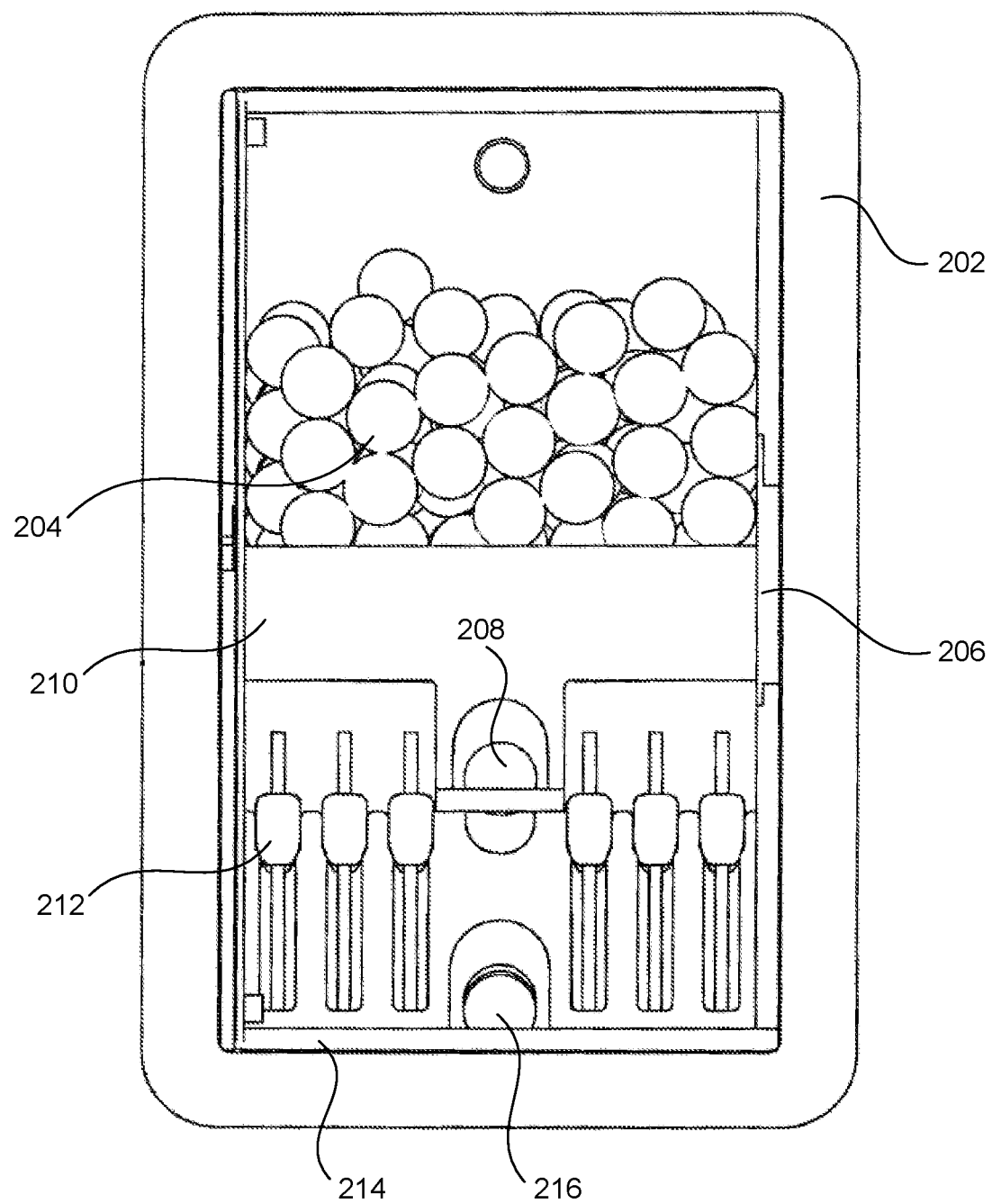
FIG. 2A illustrates an example embodiment of an Object Container.
Figure 2B:
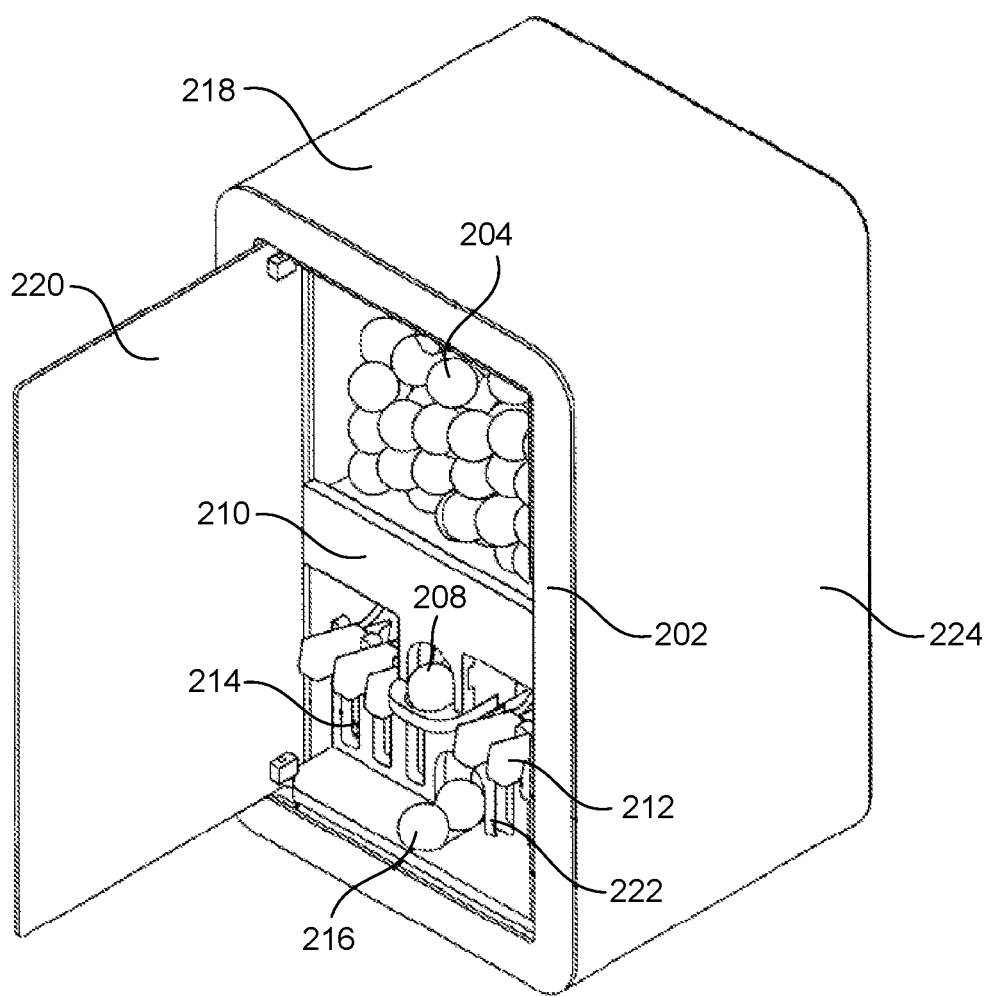
FIG. 2B illustrates an example embodiment of an Object Container.

As will be discussed below, in the example of FIGS. 2A and 2B, Object Container 102 is specifically designed to hold a ping pong set including racquets and balls. However, Object Container 102 may be designed to hold various other types of objects instead, with each Insert 309 being modularly designed to hold different equipment needed for different types of objects.

Object Container 102 includes Controller 112 to communicate with users and control the various devices in Object Container 102. Controller 112 includes a CPU 318 having a processor, memory, and storage suitable to execute instructions to control these devices. In an embodiment, CPU 318 is chosen for low power consumption. An embedded system such as a single-board computer utilizing a low power System-on-Chip ("SoC") design or other types of low-power systems are preferable in this embodiment. Other types of low-power computing designs may be used in CPU 318 such as a microcontroller, an ARM-based computer, a low-power x86-based computer, or the like.

Controller 112 includes Radio Communication Interface 320. CPU 318 is connected to Radio Communication Interface 320 over a bus, such as a universal serial bus ("USB"), a Peripheral Component Interconnect Express ("PCIE") bus, or the like. Radio Communication Interface 320 is configured to allow Controller 112 to communicate over Communication Channel 111. Radio Communication Interface 320 may be any kind of radio frequency communication interface such as is known to one of skill in the art, for example a Bluetooth interface, a Wi-Fi interface, a cellular data interface, or the like. Radio Communication Interface 320 may also incorporate multiple different technologies, such as supporting both Bluetooth and Wi-Fi. In an embodiment, Radio Communication Interface 320 is a Bluetooth Low Energy ("BLE") wireless personal area network adapter in conformance with Bluetooth Core Specification Version 4.0 or later. In an embodiment, Radio Communication Interface 320 can provide an estimation of the range of other radio frequency ("RF") devices. For example, one embodiment uses Bluetooth signal strength to estimate the range from Radio Communication Interface 320 to another RF device. In an embodiment, the sensed devices transmit their transmit power along in a standard format, such that Radio Communication Interface 320 can utilize the sensed signal strength along with the known transmit power to infer a relative distance between devices. In an embodiment, Radio Communication Interface 320 implements the iBeacon standard for Bluetooth beacons to accomplish this range estimation. Other such beacon range finding methods and standards may be used by one of skill in the art as necessary.

Radio Communication Interface 320 includes one or more antennas to facilitate wireless communications. In an embodiment, Radio Communication Interface 320 includes at least one antenna internal to Object Container 102 and one antenna external to Object Container 102. Internal Antenna 324 can communicate with Objects 104 within Object Container 102 when Door 307 is closed. External Antenna 322 can communicate with devices outside of Object Container 102. In some embodiments, Object Container 102 is made of a conductive material such as steel, so that when Door 307 is closed Object Container 102 forms a Faraday cage surrounding Controller 112 and Radio Communication Interface 320. This effect would otherwise block radio frequency communications from Controller 112 inside Object Container 102 to devices outside of Object Container 102. In these embodiments, it is necessary to have both an Internal Antenna 324 and an External Antenna 322, so that Controller 112 can communicate using radio frequency communications to Objects 104 within Object Container 102, as well as devices outside of Object Container 102. Internal Antenna 324 and External Antenna 322 may be either omnidirectional or have some directional characteristics. In addition, Internal Antenna 324 and External Antenna 322 may each comprise two or more individual antennas multiplexed or otherwise combined to form a single radiating device. For example, in an embodiment, External Antenna 322 may comprise four individual directional antennas placed on four sides of a rectangular Object Container 102. Similarly, in an embodiment, Internal Antenna 324 may comprise two or more directional antennas within Object Container 102 that have varying signal strengths in different regions of Object Container 102.

Object Container 102 includes one or more power sources such as Power Source 315. Power Source 315 provides power to Controller 112, Lock 310, and any other electronic devices within Object Container 102. In an embodiment, Power Source 315 is a battery power source. In this embodiment, Power Source 315 may include multiple battery cells or other such smaller battery components. In an embodiment, the battery source in Power Source 315 is a battery pack based on lithium chemistry for long life and power density. In other embodiments, any conventional battery type may be used, such as NiCad, NiMH, lead-acid, or other such battery technologies. In an embodiment, a battery within Power Source 315 has the capacity to run the computing and other resources within Object Container 102, for example, for at least two years without requiring replacement or recharging.

In an embodiment, Power Source 315 includes a solar power source to augment or supplement a battery-based component of Power Source 315. The solar source in Power Source 315 may be configured to charge the batteries during peak solar output, and then Object Container 102 runs off of the charged batteries.

Other power sources may be used in other embodiments, either alone or in combination with battery and/or solar power sources. For example, in some locations Object Container 102 may be placed near a municipal AC power source such that Object Container 102 plugs into a standard power outlet. In such an embodiment, Power Source 315 is configured to condition and convert power as necessary to power the electronic devices within Object Container 102. Any other power source may be used as well to power the electronic devices within Object Container 102 such as may be appreciated by one of skill in the art.

Object Container 102 is designed to hold and detect Objects 104. Insert 309 is placed in Object Container 102 and shaped so as to accommodate particular Objects 104. For example, if Object 104 is a croquet mallet, Insert 309 has a cutout such that the croquet mallet sits within or on a cutout and/or shelf in Insert 309. Insert 309 is shaped so that each and every Object has a place where it belongs. In an embodiment, Insert 309 is modular so that multiple sub-inserts can be combined to form a single, complete Insert 309. For example, modular pieces may be assembled so that there are spaces for six croquet mallets, six balls, and nine wickets. Or, modular pieces may be provided so that there are spaces for four croquet mallets, ten balls, and thirteen wickets all within the same Object Container 102, for example. In an embodiment, Insert 309 is made of wood. In another embodiment, Insert 309 is made of a plastic material. Other materials may be used as well as appropriate as would be understood by one of ordinary skill in the art.

Insert 309 may be connected to and/or incorporate one or more shelves in Object Container 102. In an embodiment, these shelves have integrated into them a scale for weighing Objects 104 placed in Insert 309 on each shelf. The integrated scales have enough precision to detect the presence or absence of Objects 104. For example, if a croquet ball is removed from Insert 309, the scale integrated into the shelf will register a lighter weight than expected. Controller 112 then uses this information along with other information to determine whether or not all of Objects 104 that are expected to be in Object Container 102 are indeed present.

For example, due to the modular nature of Insert 309, two or more scales may be integrate into different portions of Insert 309 so that more than one weight is sensed. For example, a separate weight may be sensed for croquet balls in the croquet ball section as compared to the croquet mallet section. In addition to the presence or absence detection, the weight sensors can be used to detect wear and/or damage to Objects 104. For example, if a croquet mallet is placed within the box but the weight sensor for that croquet mallet determines the weight is under what is expected, this may be a sign that there has been significant damage to the mallet resulting in a portion of the mallet being sheared or broken off. Similarly, if an item is replaced at a significantly higher weight than expected, that may be an indication that there is mud or soil attached to Object 104 and that it needs to be cleaned. In an embodiment, an expected weight may be calibrated upon installation of Object Container 102, or periodically throughout the lifetime of Object Container 102. The expected weight may be based on such a calibration, or it may be based on tables of known weights for Objects to be stored in Object Container 102.

In an embodiment, Controller 112 may alternatively or additionally use radio frequency communications to identify Objects 104 that are placed in Object Container 102. For example, in an embodiment, Radio Communication Interface 320 is a Bluetooth interface, and one or more Objects 104 have embedded Bluetooth transponders that uniquely identify each Object 104. In this manner, Controller 112 may determine whether all Objects are present, or determine which Objec(s) are missing, based on the expected Bluetooth codes.

In an embodiment, Controller 112 uses weight information of the objects on each shelf in conjunction with Bluetooth communications data to assess the contents of Object Container 102. The combination approach is beneficial because it allows for a mixture of identification methods to be used. For example, in the croquet example, it may not be possible and/or feasible to embed Bluetooth transponders in each wicket or ball. Some Objects are too small, or made of a material that is not conducive to embedding electronics such as a Bluetooth transponder. However, other Objects 104 are conducive to embedded electronics, such as a croquet mallet.

So in an example combined approach, the croquet mallets in the example set have Bluetooth transponders integrated into them, for example in the handle, while the croquet balls and wickets do not. Thus, Controller 112 can identify the contents of Object Container 102 by interrogating the Bluetooth transponders in the croquet mallets as well as weighing the contents of each shelf to determine the presence of absence of any Objects 104. To do this, Controller 112 has knowledge of the expected weight range of all Objects 104 individually, and therefore also in aggregate. In the example, if a shelf is weighed to be several ounces under the expected weight, Controller 112 may deduce that a single wicket is missing. However, if the expected weight is several pounds under the expected weight, it may be difficult or impossible to determine the missing Objects 104 by weight alone. Perhaps a croquet mallet has the weight of three croquet balls, then Controller 112 may not be able to discern the difference between a missing mallet or missing three balls. In this instance then, Controller 112 uses the Bluetooth capabilities of Radio Communication Interface 320 to determine the presence of the mallets within Object Container 102. If a Bluetooth transponder corresponding to a mallet is present within Object Container 102, then Controller 112 can deduce that it must be the three balls that are missing. Conversely, if Controller 112 does not detect the presence of the radio frequency transponder in the mallet, then it can deduce that the mallet is the piece that is missing, and that the three balls are likely not missing. In addition, Controller 112 may make use of range finding or proximity determination features of Radio Communication Interface 320 to estimate a distance from Object Container 102 to Object 104. This range information can then be used in conjunction with the other supplied information to determine the presence or absence of Objects 104.

In other embodiments, other techniques may be used in conjunction or in place of the weight and/or radio frequency communications methods described above. In an embodiment, Controller 112 includes a camera and a light source within Object Container 102 and uses image processing to determine the presence of absence of individual Objects 104 within Object Container 102. In another embodiment, Insert 309 includes electro-mechanical switches that are depressed when the appropriate Object 104 is inserted into its appropriate slot. In another embodiment, Radio Communication Interface 320 is an radio frequency identification ("RFID") interface, and Objects 104 have RFID tags embedded into them. In yet another embodiment, Objects 104 contain a visual identification barcode, such as a QR code or the like that is scanned by a barcode scanner within Object Container 102 that aids in Object detection. Any combination of these or other approaches may be used by one of skill in the art to determine the presence or absence of Objects 104 within Object Container 102.

Some embodiments of Object Container 102 are adapted to the type of Objects contained therein. FIGS. 2A and 2B illustrate an embodiment of an Object Container 200 for the game of Ping-Pong, otherwise known as table tennis. Object Container 200 includes a hardened high grade steel Chassis 224 for its housing. Insert 210 holds the Objects in the container. Insert 210 may be permanent or replaceable, and may be made of any suitable material such as wood or durable plastic. Door 220 is secured shut by Lock 206 when the container is locked. In Object Container 200, balls are kept in Ball Dispenser Unit 204. In an embodiment, Ball Dispenser Unit 204 is smartphone controlled and communicates through Bluetooth. Balls can be bought using the individual user's smartphone, for example through a corresponding application, and dispensed out to the user through example Ball Dispenser Unit 204. In this example, Ball Dispenser Unit 204 dispenses balls through Dispensing Hole 208. Balls drop down to Ball Tray 216 when dispensed. In the illustrated example, the container also holds Ping-Pong paddles (bats) 212. The weight of all of the Objects in the container is weighed by an Automatic Sensor System 214, to ensure that all borrowed items are returned and/or in their proper places. In an embodiment, Automatic Sensor System 214 includes one or more weight sensors. Automatic Sensor System 214 is connected to Controller 218 located inside of Object Container 200.

Objects

Object Container 102 may hold any kind of Objects 104. For example, Objects 104 may include any kind of object that people want to share in public or communal spaces. Objects 104 may be selected according to the space where they are deployed and the people who will be using them. In an embodiment, Objects 104 are built to a high standard of quality so that they are long lasting and will perform well over many years of use by many people. Objects 104 may also adhere to a high standard of design such that they are easy and pleasant to use.

In one embodiment, Objects 104 are game implements used to play a game, such as a multi-player game that promotes social interaction and/or engagement. Examples of such social games include, for example and without limitation, croquet, pétanque, bocce, ping pong, basketball, horseshoes, chess, checkers, and backgammon. Examples of Objects 104 used to play these games include but are not limited to mallets, balls, paddles, boards, and other game pieces, etc. FIG. 6A illustrates one example of a croquet mallet as Object 602. Similarly, FIG. 6B illustrates an example tennis racquet as Object 606.

In other embodiments, Objects 104 are not implements to play games. For example, Objects 104 stored in Object Container 102 may include one or more items having a high price tag and/or requiring inconvenient storage space, but an expectation of only periodic or infrequent use by a single party, such that the cost-value ratio of the object can be optimized by sharing the use with other parties. Examples of such Objects 104 include, without limitation, a kitchen appliance, a charger for an electronic device such as a smartphone, sailing tools, a lawnmower, or a snow blower. Other such Objects 104 may also be used with Object Sharing System 100 as will be appreciated by one of skill in the art. Any object that may be both contained and shared among multiple people is contemplated for use as an Object 104. Such objects can be purchased collectively by intended users such that the cost is shared, by a facility for the use of its patrons, by a municipality for the use of all, by a benefactor, etc.

In an embodiment, Object 104 includes a digital tag. For example, Object 602 include Digital Tag 604. In an embodiment, Digital Tag 604 is a small computing and/or communications device that performs several different functions. Digital Tag 604 may act as a transponder to communicate the presence and location of Object 104. In such embodiments, Digital Tag 604 may employ a similar radio frequency communication method as used by Controller 112 and Radio Communication Interface 320. In an embodiment, Digital Tag 604 is a radio frequency transponder, such as a RFID tag. In other embodiments, Digital Tag 604 uses Bluetooth technologies to communicate with Radio Communication Interface 320. In some embodiments, Digital Tag 604 incorporates additional computing and/or sensing capabilities. For example, Digital Tag 604 can include one or more accelerometers to sense and record the acceleration of Object 104. Such a Digital Tag 604 would also include capabilities, such as a transponder, to transmit the sensed acceleration data to Controller 112 or to a user's smartphone for further processing. Digital Tag 604 may include other sensors such as temperature sensors, vibration sensors, gyroscopic sensors, orientation sensors, and the like to determine relevant aspects of Object 104's usage. For example, a tennis racket may have a Digital Tag 604 with an embedded 3-axis accelerometer that records the accelerations and forces of the tennis racket while in use. This information can be used for entertainment value as well as diagnostic value. For example, knowing the speed of the hardest hit tennis ball may be interesting to users, and knowing the amount of torque the tennis racket experience when it hits a ball may help a tennis player improve their swing. Thus, the information that Digital Tag 604 gathers and reports can add greatly to the enjoyment of a game utilizing Object 104. In some embodiments, Digital Tag 604 is used only for location and/or presence tracking and does not incorporate other sensors.

Smartphone

FIG. 8 is a diagram of an example Smartphone 110 in accordance with an embodiment. Smartphone 110 includes Processor 810, Communications Interface 820, Display 830, Memory 850, and one or more Applications 860. As described herein, Smartphone 200 may be a mobile telephone, smartphone, laptop computer, tablet computer, portable digital assistant, or other mobile device capable of communicating over a wireless network.

Processor 810 may be coupled to Memory 850, which may store instructions to be executed by Processor 810. Smartphone 110 may also include one or more Applications 860, which may reside in a Memory 850 of Smartphone 110. Communications Interface 820 allows data to be sent and received by Smartphone 110 via a network, such as a cellular network or computing network (e.g., the Internet). Applications 860 may be executed by Processor 810. Applications may include, but are not limited to, multimedia applications, web browser applications, gaming applications, clock applications, messaging applications, payment applications, and the like. In one embodiment, one or more Applications 860 may be executed depending on a determined context of the Smartphone 110. In an embodiment of the present invention, Applications 860 include an application that provides an interface for user interaction with Object Sharing System 100. In an embodiment, the same or a different Application 860 provides a tunnel through which Object Container 102 can communicate with Network 108, as discussed below. Such an Application 860 may operate in the background of Smartphone 110, such that a user need not be actively using the device in order for tunneling to occur; in another embodiment, the user must specifically authorize Application 860 to allow such data transfer between Object Container 102 and the network.

Various Smartphones may also have the ability to allow multiple user accounts. Thus, the context of Smartphone 800 may also depend on the user account currently logged in on Smartphone 800. For example, a device may be shared by multiple members of a family. Various sensors may also be included in Smartphone 800, such as a camera and GPS or other locationing sensor (not shown).

Although only Processor 810, Communications Interface 820, Display 830, Memory 850, and Application 860 are shown, it would be apparent to a person skilled in the art that Smartphone 800 may include additional components, modules, and/or sub-components as may be necessary.

Sharing Objects

Returning to FIG. 1, FIG. 1 illustrates an embodiment of the infrastructure used by Object Sharing System 100. Object Container 102 contains Objects 104. Controller 112 is integral to Object Container 102 and communicates with Objects 104 via radio frequency communications. Controller 112 also communicates with Sensors 106 and Lock 107 within Object Container 102. Controller 112 communicates with Smartphone 110 over Communication Channel 111. In an embodiment, this communication is via radio frequency communication. In an embodiment, Controller 112 and Smartphone communicate over Communication Channel 111 via Bluetooth radio frequency communications. Smartphone 110 in turn communicates with Server 120 over Network 108. Network 108 may be a computer network such as the Internet, a cellular network, a hybrid of the two, or any other collection of components that transmit information from one place to another. In an embodiment, Smartphone 110 communicates with Server 120 via cellular data communications or Wi-Fi data communications. Server 120 includes several modules including Database 122, Payment System 134, Proximity System 136, and Matchmaking System 130.

A user can use Smartphone 110 to open Object Container 102. This process is described in FIGS. 5A and 5B. Together, FIGS. 5A and 5B are a process flow diagram illustrating steps in process 500. In an embodiment, process 500 involves Smartphone 110 communicating with Controller 112 via Radio Communication Interface 320 and Server 120 over a cellular or other data connection. First, a secret key is stored in Controller 112. This secret key can be, for example, a 32 byte value. The secret key can be generated at the time of manufacture of Controller 112, or at the time of deployment of Object Container 102 in a communal space. The secret key is stored in a memory of Controller 112 and is also stored in a memory in Database 122 of Server 120. The secret key cannot be read from Controller 112 or Server 120 after initialization; it is kept secret.

First, at step 502, Smartphone 110 requests permission to unlock Object Container 102 from Server 120. Next, at step 504, Server 120 authenticates Smartphone 110 and returns permission to Smartphone 110. Smartphone 110 may be authenticated by any number of methods known to those of skill in the art for remotely authenticating user devices, such as via unique token exchange. At step 506, Smartphone 110 initiates a data connection with Controller 112 via Radio Communication Interface 320. In an embodiment where Radio Communication Interface 320 is a Bluetooth interface, this data connection is a Bluetooth data connection. According to an embodiment, Smartphone 110 and Controller 112 use the "Secure Simple Pairing" pairing methods of the Bluetooth specification, such as is described in the whitepaper "Bluetooth® User Interface Flow Diagrams for Bluetooth Secure Simple Pairing Devices," V1.0, published by the Bluetooth Special Interest Group—Usability Expert Group on Sep. 17, 2007, incorporated by reference herein. For example, Smartphone 110 and Controller 112 may use any of the forms of pairing specified by the "Secure Simple Pairing" Bluetooth specification, including "Just Works," "Numeric Comparison," and "Passkey Entry," as well as utilizing other means of communication through "Out of Band" pairing. In an embodiment, the devices utilize the "Just Works" pairing methodology for ease of use. In this pairing method, Controller 112 and Smartphone 110 are able to establish a data connection over Bluetooth using a minimum of user interaction, generally requiring a simple authorization to connect on the user's Smartphone 110. This allows a user to easily and quickly establish a connection to Controller 112 using their Smartphone 110 without requiring entry of a passcode or other authentication means.

Next, at step 508, Controller 112 generates a piece of data called a nonce. In an embodiment, the nonce is a randomly generated 32 byte sequence of data. Controller 112 is configured to distribute a given nonce only once, so that no two instances or users ever receive the same nonce. Controller 112 may achieve this by utilizing a cryptographic random number generator, a list of pre-generated nonce values, or even by storing a sequence of available nonce values that have been verified as unique. As one of ordinary skill in the art will appreciate, any method of generating a sufficiently unique global value such as a universally unique identifier or a globally unique identifier may also be used to ensure that nonce values are unique.

At step 510, the nonce is transmitted from Controller 112 to Smartphone 110 via Communications Channel 111. When Smartphone 110 receives the nonce supplied by Controller 112, Smartphone 110 transmits the nonce to Server 120 at step 512. Smartphone 110 may transmit the nonce to Server 120 utilizing any appropriate data communications method known to those of skill in the art, such as but not limited to cellular data communications, Wi-Fi data communications, or the like.

At step 512, Server 120 validates the user's permission to unlock Object Container 102. Permission is only granted when the scheduling and/or payment requirements or the like as set forth by Object Sharing System 100 are satisfied. If permission is granted, Server 120 generates a public key based on the nonce and the secret key. As discussed above, the secret key is known only to Server 120 and Controller 112. In an embodiment, Server 120 uses a cryptographic method to generate a cryptographic public key from the nonce and the private key. For example, Server 120 can encrypt the nonce utilizing a symmetric-key encryption algorithm such as but not limited to Advanced Encryption Standard ("AES"), Rivest Cipher 4 ("RC4"), Triple Data Encryption Algorithm ("3DES"), or others known to those skilled in the art. Other algorithms may be used to generate a public key based off of the nonce value generated by Controller 112 and the private key stored in Server 120 as known to those skilled in the art. For example, in one embodiment the public key is generated by computing a one-way hash of the nonce value combined with the secret key. The two values can be concatenated and hashed to produce a public key which does not reveal the secret key value. Examples of one-way hash functions include MD4, MD5, SHA-1, and SHA-2. In any case, however, Server 120 generates a unique public key that is uniquely generated from the stored secret key value and the generated nonce value from Controller 112. The private key cannot be deduced from knowing the public key and the nonce value, keeping the private key known only to Controller 112 and Server 120. Next, Server 120 transmits this public key back to Smartphone 110.

Smartphone 110 receives the calculated public key from Server 120 in step 514. Continuing to FIG. 5B, Smartphone 110 transmits the received public key to Controller 112 at step 516. Then, Controller 112 uses the same algorithm that Server 120 used in step 516 to generate a public key the same way Server 120 did. This requires that Controller 112 and Server 120 be configured to generate public keys based off of nonce values and private keys in the same way using the same algorithms. Next, at step 516, Controller 112 compares the public key received from Smartphone 110 and the public key calculated by Controller 112. If the two keys match, then that means the public key received from Smartphone 110 was generated by Server 120 and indicates to Controller 112 that Server 120 has authorized Object Container 102 for the user of Smartphone 110. If the keys do not match, that indicates to Controller 112 that the received public key was not generated by Server 120 and that the user of Smartphone 110 does not have permission to open Object Container 102. If the keys match, Lock 102 is unlocked at step 518.

In this way, the Controller can utilize the network communications of Smartphone 110 to verify that the user of Smartphone 110 has authorization from Server 120 to open Object Container 102. This method does not require that Controller 112 have independent network communications with Server 120, and allows Controller 112 to operate on a very low power budget appropriate for battery or solar operation for a long period of time. While it is contemplated that Controller 112 may alternatively maintain its own data connection with Server 120, the power requirements of Controller 112 would be much greater and long periods of battery or solar operation may be challenging. Should municipal power be used to power Object Container 102, however, it may be easier for Controller 112 to communicate directly with network 114 if desired.

In an embodiment, Server 120 records information in a Database 122. Information recorded includes the identity of users requesting to open an Object Container, the games they played, when the Objects were returned, and other such transactional data involved in Object Sharing System 100. In an embodiment, Database 122 is a distributed database such as a blockchain database. A blockchain database stores transactions chronologically, where each block in the chain includes information regarding multiple transactions and reference to a prior block, as well as a validation code to ensure authenticity of the data. Further details regarding implementation of a blockchain database and use in transactions can be found in the following white paper: Wright, A. and De Filippi, P., "Decentralized Blockchain Technology and the Rise of Lex Cryptographia" (Mar. 10, 2015), available at SSRN: http://ssrn.com/abstract=2580664, which is incorporated by reference herein in its entirety.

A transaction in Object Sharing System 100 is any of the events outlined above such as a borrow history, a return history, a damage report, and other such transactions involved in Object sharing. Any blockchain database known to those skilled in the art may be used, including blockchain databases such as those utilized by cryptocurrencies or other such blockchain implementations such as Ethereum (see Wood, G., "Ethereum: A secure decentralised generalised transaction ledger," Ethereum Project Yellow Paper (2014), which is incorporated by reference herein in its entirety). Using a blockchain for Database 122 in Object Sharing System 100 helps maintain an objective log of events and transactions that cannot be tampered with. This provides safeguards for the operator of Object Sharing System 100 as well as the users of Object Sharing System 100. In addition, many blockchain databases are distributed databases that provide redundancy and resilience to failure not seen in more traditional database structures. For example, if a database server operating a SQL database is corrupted, the data in the database may be lost. By contrast, a distributed blockchain database can be operated across many geographically diverse computing resources, so that failure of some nodes does not corrupt the database. Furthermore, the operator of Object Sharing System 100 does not need to control or trust the other nodes of the blockchain distributed database due to the cryptographically provable nature of the blockchain database, further improving data integrity and lowering costs for the operator.

Another function of Server 120 is to match users of Object Sharing System 100 for joint use of Objects 104. For example, in an embodiment Objects 104 are game implements such as implements to play the game croquet. In this case, Server 120 functions to match individuals who are likely to want to play croquet with each other. Server 120 accomplishes this via Matchmaking System 130. Matchmaking System 130 implements a matchmaking algorithm to connect potential users of Object Sharing System 100. One goal of Matchmaking System 130 is to create conversations among strangers in the public space, based on an assumption that users are surrounded by "friends they haven't met yet." Matchmaking System 130 takes into account many disparate data inputs to determine whether two users may be a match for a shared experience surrounding Objects 104, such as a game of croquet. Matchmaking System 130 connects with external data sources as well as internally recorded data to determine a match.

One source of external data is social media networks such as Facebook, Twitter, LinkedIn, and the like. A user of Object Sharing System 100 can optionally connect these various external social networks to Matchmaking System 130 at the time of enrollment or at a later time. Other sources of data include location data gathered through Smartphone 110 and health data. Health data may be gathered through Smartphone 110 or through specialized health tracker hardware, such as wearable devices that monitor and record health metrics. One example of such a health tracker is a FITBIT® health tracker or the like. Other sources of data that may be collected are so-called "conversation starters," chosen by users at the time of enrollment into Object Sharing System 100. These "conversation starters" may be topics that have a special interest for the individual user. Examples of "conversation starters" are AirStream caravans, dinosaurs, philosophy, football, religion, kids, climate change, or the like. In addition, basic demographic information is gathered at the enrollment stage, including information such as gender, age, nationality, locality, and other such demographic information. Alternatively, this demographic information may be supplied by a third party social network as described above.

Figure 4:
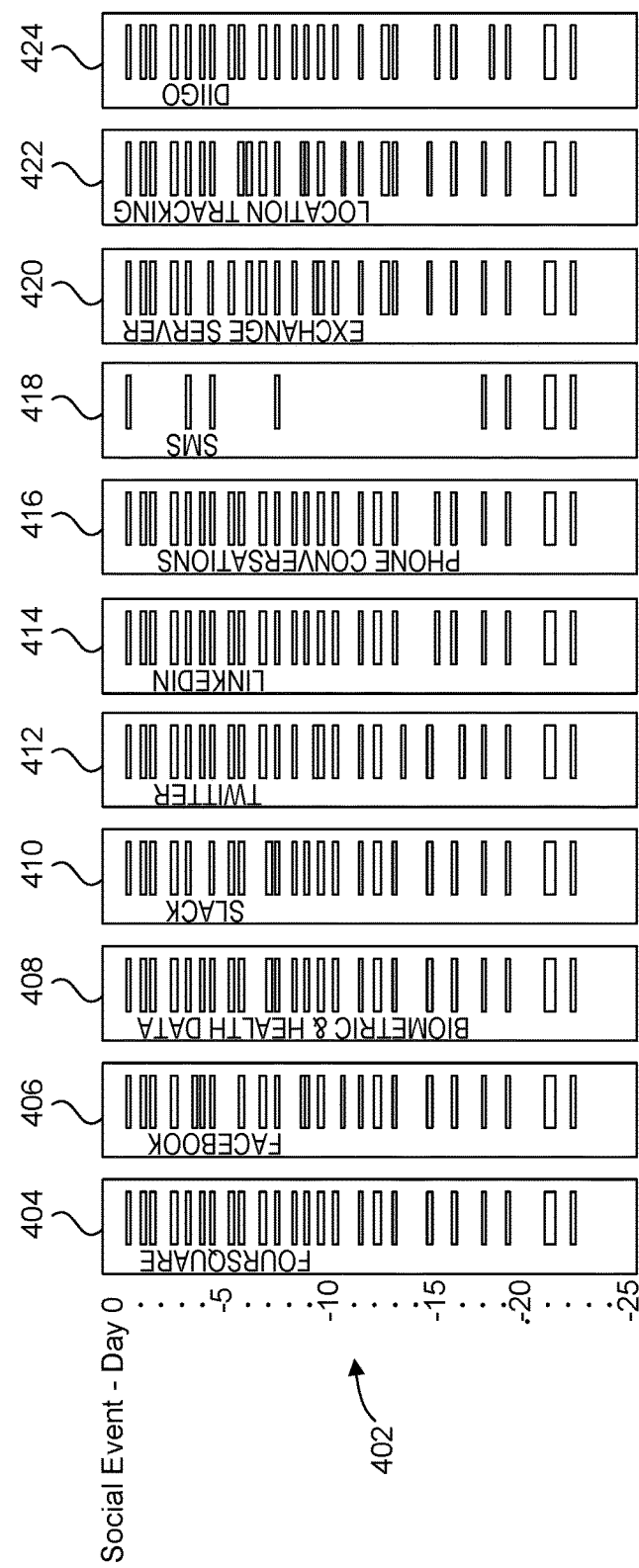
FIG. 4 illustrates an example "Social DNA" used by an embodiment of the invention.

All of this data forms a user's "Social DNA" 400 as depicted in FIG. 4. A user's Social DNA is a dynamic social profile specific to the user, that aggregates the user's social and demographic information. Such social and demographic information may include, for example and without limitation, social graphs from various social media platforms, previous digital interactions such as "likes," health data from wearables, location specific activities, age, gender, nationality, etc. Social DNA 400 comprises a timestamped database of a user's social interactions both within Object Sharing System 100 and in other social networks. One piece of information in Social DNA 400 is a user's history of using Objects within Object Sharing System 100. For example, if a user plays a game of pétanque with another user, the identities of those users, the game they played, where they played, the score of the game, and other such data may be recorded in each user's Social DNA 400. This information can inform Matchmaking System 130 of a user's preference of game, partner, etc. In addition, for embodiments where Objects 104 record and store additional sensory information such as acceleration data, that information may be stored in the user's Social DNA 400 as well. This information can inform Matchmaking System 130 as to a user's level of play, ability, or skill. For example, a user that hits tennis balls at 100 MPH may not be a good match for a user who hits at 50 MPH. The two players are playing at different levels of play and may not be happy with being matched with each other. Other such information can be entered by users. For example, users may enter the score of a game via Smartphone 110 after a game is played. In this way, Matchmaking System 130 can maintain an estimation of a user's level of play in that particular game. If one user habitually loses to another, Matchmaking System 130 can deduce that the first user is likely not as competitive as the second, and can use that information to inform future matches.

Matchmaking System 130 may employ a machine learning, expert system, or other such artificial intelligence routine to evaluate and determine matches among users. One such algorithm class is that of neural networks. In a neural network, many disparate data inputs can be combined to determine an output, such as the binary decision of whether or not to make a match. The neural network can be trained by users. For example, the system may request that users rate the quality of the match at the end of a game. For example, in an embodiment, the users are prompted to rate the quality of the match on a star-based system where more stars indicates a better quality of match. Then, Matchmaking System 130 can use this feedback to train a neural network to better make future matches. For example, Matchmaking System 130 may employ a dynamic algorithm that is continuously calibrated and updated based on new positive and negative interactions. For example, Social DNA profiles of many users can be compared to find significant patterns that inform or re-calibrate the matchmaking algorithm. In an embodiment, different matchmaking algorithms exist for different contextual social profiles, such as gaming and working.

In an embodiment, the Matchmaking System 130 operates by computing a weighted output of all points of correlation between two user's respective Social DNA. For example, one point of correlation may be a favorite music genre shared between the two users, or the users' connections on a social media platform. Matchmaking System 130 compares such various points of data from two users' Social DNA 400 and weighs the importance of each using a weighting algorithm. The relative importance of each point of comparison between two users' Social DNA 400 is determined by the series of weightings applied to these data points.

Calibrating the relative weights of these comparisons is performed iteratively by the Matchmaking System 130. In an embodiment, an initial seed algorithm may include previously-defined weights that have been assigned to each input. The weights can then be updated using an iterative feedback method such as those that would be known to one of skill in the art. However, iterative feedback methods known in the art would typically adjust relative weights of each data point after both successful and unsuccessful matches. According to an embodiment of the present invention, a new iterative feedback method updates the relative weights of each data point only after certain types of feedback. Specifically, in an embodiment, the relative weights of each input are updated only after matches that have been identified as strongly successful. For example, consider a system wherein each party to a match rates the match on a scale of 1 to 10, where 1 indicates a highly unsuccessful match, and 10 indicates a highly successful match. In this example, only the subset of matches having a rating indicative of success, such as a 9 or 10, would be used as feedback to adjust the relative weights of each input in the matchmaking algorithm, using the strengths of the correlation of data points between each of the two users' Social DNA 400. The updated matchmaking algorithm can then be used to predict the next match, and later successful matches can be used to further calibrate Matchmaking System 130 in an iterative manner.

In this way, the Matchmaking System 130 reverse engineers successful matches algorithmically. Therefore, inherent biases and assumptions made by pre-defined algorithms can be avoided, and the impact of unsuccessful matches on the quality of the system is limited. Additionally, by automatically filtering out the unsuccessful matches, and updating the matchmaking algorithm with information learned only from the successful matches, the speed and accuracy with which the matchmaking algorithm identifies future successful matches increases as compared to traditional matching feedback systems. Furthermore, Matchmaking System 130, using this approach, can determine unforeseen factors that lend toward a successful match, which might otherwise be hidden in the noise of a typical system.

Alternatively or in addition, Matchmaking System 130 can employ expert systems encoding rules generated by human programmers to make matches. For example, one such rule may indicate that preference is given to users who live in the same city, based on the assumption that a commonality of location will produce a better match than if the users were from different localities. Alternatively, the expert system may be programmed to give preference to users who do not share a locality in common to foster communication between users who are from different places. In any event, Matchmaking System 130 can use any of the data available to it to suggest matches to users.

Around each Object Container 102 may be a geographically bounded area known as a geo-fence. The geo-fence for Object Container 102 may include areas where people are likely to use Objects 104 contained in Object Container 102. For example, in an embodiment where Objects 104 are gaming implements, the geo-fence area is a public area such as a park or garden where users can use Objects 104. In other embodiments, the geo-fence area can be any appropriate area in which Objects 104 are to be used. When a user utilizing Smartphone 110 enters the geo-fence area for Object Container 102, Smartphone 110 is configured to prompt the user to ask the user if they are interested in using Object Container 102. For example, upon entering a park having a croquet set in Object Container 102, Smartphone 110 will prompt the user regarding whether they want to play a game of croquet. The user enters either yes or no, depending on if they want to play or not. If yes, Smartphone 110 communicates with Server 120 and Matchmaking System 130 to determine whether there are other potential users in the same park.

For example, a user may indicate that they want to play croquet, either on their own initiative or after being prompted by the system. In response, the system may determine that there are 23 other people in the park that also want to play croquet. Smartphone 110 is configured to then present a user interface to facilitate choosing a play partner. This user interface may be part of, for example, Application 860 stored on Smartphone 110. One example of this user interface is to display the "conversation starters" that the users have previously entered into Matchmaking System 130. These "conversation starters" may be displayed as, for example, a tag cloud or word cloud, and can provide some sense of personality and likelihood of fit to the user, and the user can select one or more of the "conversation starters" to initiate a match. The user's selection is then sent to Server 120. The other users in the park also receive an indication of a new user desiring to play croquet, and each decides if they want to play croquet with that new user. Alternatively or in addition, Matchmaking System 130 can automatically suggest new matches to users to aid in the pairing process. Other forms of matching and pairing of users can be employed as would be appreciated by one of skill in the art.

Matchmaking System 130 can also encourage users to meet and use Objects together via a "nudge" feature. The "nudge" feature provokes users to action by suggesting that they meet a user to share in use of an Object, even if the user has not yet indicated a desire to do so. Matchmaking System 130 uses machine learning and data mining to predict when to nudge users for maximum likelihood of action. For example, Matchmaking System 130 may nudge a user to go to the park on a sunny day to play croquet with another user who is a good match for a game. The user may not have had plans to go to the park that day, but a subtle reminder and nudge from Matchmaking System 130 encourages the user to go out and use Objects in the park.

Smartphone 110 also facilitates making purchases or providing other payments to Object Sharing System 100. Examples of purchases may be consumable items such as those that are of low cost and have low reusability, such as, without limitation, ping pong balls. These items may not be Objects because they are not expected to be returned. In addition, if a user does not return Object 104 or returns Object 104 with heavy damage, they user may be charged for the replacement value of Object 104 to maintain availability of Object 104 for all. For example, if a user takes out a croquet mallet from Object Container 102, but the container senses that the object is not replaced by an expected time or within a given period of time, Object Sharing System 100 will charge the user for the replacement cost of the croquet mallet. Object Sharing System 100 uses Payment System 134 in Server 120 to facilitate charging users. As a part of the enrollment process, a user is prompted to provide payment details such as a credit card account. This payment account will then be charged by Payment System 134 in the event that a charge is incurred.

In some embodiments, basic use of Object Sharing System 100 is free of charge such that users are not normally charged money to use Objects 104. These embodiments may rely on a third party benefactor such as a municipality or college campus to subsidize the cost of sharing Objects 104. In other embodiments, use of Object Sharing System 100 is made available on a fee basis such that utilizing Object 104 for a period of time incurs a set cost (e.g., a rental fee). These costs are also processed through Payment System 134 in Server 120. In yet other embodiments, a hybrid approach is taken where some costs of Object Sharing System 100 are subsidized by a third party, but some costs are paid for by the end users. This may result in lower per-usage fees for end users. Object Sharing System 100 is compatible with any combination of revenue method as will be appreciated by one of skill in the art. In still other embodiments, a deposit may be held in the user's account, but returned or released upon return of the object. Object Sharing System 100 contains all of the infrastructure to charge any applicable source for any usage.

Server 120 may also implement a reservation and booking system for reserving usage times of Objects 104. For example, if a user wishes to plan ahead to play croquet at a park on Saturday during peak usage hours, they can reserve usage of the croquet set through Server 120 in advance to ensure availability when they get to the park. In addition, the user can employ Matchmaking System 130 to find a game partner to play with for the reserved time period ahead of time.

Smartphone 110 is configured to aid Object Container 102 in determining the status and presence of Objects 104. Object Container 102 uses a combination of sensors and approaches to determine the presence or absence of Objects 104 within Object Container 102, as well as approximate their status regarding damage or wear. However, in some situations there may remain ambiguity based on the sensors in Object Container 102 alone. In these cases, Smartphone 110 is configured to aid in determining the status of Objects 104. In one embodiment, Smartphone 110 is configured to take a photo of Objects 104 and send the photo to Server 120 to establish the presence or status of Objects 104. The photo may reveal an error in Object Container 102 where the container reports a missing object due to an error, but the photo indicates that all Objects 104 are where they belong. In addition, Object Container 102 may indicate wear or damage, but does not know what the damage or wear is. In these cases, the photo can be used for further analysis of the wear or damage state of Object 104. Furthermore, Smartphone 110 may be configured to merely prompt users to rate the status of objects, facilitating quick reporting of the wear and damage status of Objects 104 without needing to take a photo.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

The following description of a general purpose computer system is provided for the sake of completeness. Embodiments of some computing components described in the present disclosure can be implemented in hardware, or as a combination of software and hardware. Consequently, embodiments of some computing components described in the disclosure may be implemented in the environment of a computer system or other processing system. An example of such a computer system 700 is shown in FIG. 7. One or more of the computing components depicted in the previous figures, such as controller 112 or server 120, can be at least partially implemented on one or more distinct computer systems 700.

Computer system 700 includes one or more processors, such as processor 704. Processor 704 can be, for example, a digital signal processor. Processor 704 is connected to a communication infrastructure 702 (for example, a bus or network).

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718, or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

In embodiments, certain computing components may be implemented in hardware (e.g., circuits), firmware, software, or any combination thereof. Such computing components, in embodiments, may also be implemented as instructions stored on a machine-readable medium, which may be read and executed by one or more processors.

A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The above Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure.

Thus, the invention should not be limited by any of the above-described exemplary embodiments, but should be defined only in accordance with the following claims and their equivalents.

What is claimed is:

1. A system for providing access to stored objects, the system comprising:
   a housing configured to store objects comprising a first object type and a second object type having a shape different from a shape of the first object type, wherein the housing is tamper-proof and weather-proof;
   inserts located within the housing and configured to support the objects within the housing, wherein the inserts comprise a first insert having a shape specific to the shape of the first object type and a second insert having a shape specific to the shape of the second object type;
   one or more sensors configured to monitor a presence and absence of the objects;
   an electronic locking system configured to secure the housing; and
   a radio frequency communication device configured to receive access commands from a remote system, the access commands corresponding to keys generated in response to reservations for using one or more of the objects, channeled through an intermediary wireless device within a given proximity to the housing; and
   a controller configured to:
      receive an access command corresponding to a key generated in response to a reservation;
      activate or deactivate the electronic locking system based on the received access command; and
      determine whether at least one of the one or more of the objects is returned to the housing within a given period of time after removal.

2. The system of claim 1, wherein:
   at least one of the one or more sensors comprises a weight sensor configured to determine a weight of the objects; and
   the determining whether the at least one of the one or more of the objects is returned to the housing is based on the determined weight.

3. The system of claim 1, further comprising radio frequency tags attached to the objects.

4. The system of claim 3, wherein:
   at least one of the one or more sensors comprises a radio frequency identifying device configured to communicate with the radio frequency tags; and
   the determining comprises determining whether each of the objects is located within the housing based on radio frequency communications between the radio frequency identifying device and the radio frequency tags.

5. The system of claim 4, wherein the determining whether each of the objects is located within the housing based on the radio frequency communications comprises using a range estimation based on sensed signal strength at the radio frequency identifying device and a transmit power of at least one of the radio frequency tags.

6. The system of claim 4, wherein:
   the housing comprises a material that blocks radio frequency communications from outside of the housing;
   the radio frequency identifying device comprises an antenna within the housing; and
   the determining whether each of the objects is located within the housing based on radio frequency communications comprises using the antenna to receive a radio frequency communication from at least one of the radio frequency tags that are disposed within the housing.

7. The system of claim 3, further comprising status sensors attached to the objects, wherein the status sensors are configured to generate data indicative of a characteristic of the objects and the radio frequency tags are configured to transmit the generated data.

8. The system of claim 1, further comprising the remote system configured to authenticate the reservation for generating the access commands.

9. The system of claim 1, wherein the reservation comprises a rental reservation of the one or more of the objects.

10. The system of claim 1, wherein the system is configured to:
   release a held deposit upon return of the at least one of the one or more of the objects to the system.

* * * * *